United States Patent
Fukuda et al.

(10) Patent No.: US 10,882,974 B2
(45) Date of Patent: Jan. 5, 2021

(54) PARTICULATE NUCLEATING AGENT, RESIN COMPOSITION, MOLDED PRODUCT, AND PRODUCTION METHOD THEREOF

(71) Applicant: ADEKA CORPORATION, Tokyo (JP)

(72) Inventors: Takuya Fukuda, Tokyo (JP); Yuri Yokota, Tokyo (JP)

(73) Assignee: ADEKA CORPORATION, Tokyo (JP)

( * ) Notice: Subject to any disclaimer, the term of this patent is extended or adjusted under 35 U.S.C. 154(b) by 28 days.

(21) Appl. No.: 16/332,158

(22) PCT Filed: Oct. 9, 2018

(86) PCT No.: PCT/JP2018/037535
§ 371 (c)(1),
(2) Date: Mar. 11, 2019

(87) PCT Pub. No.: WO2019/220658
PCT Pub. Date: Nov. 21, 2019

(65) Prior Publication Data
US 2020/0239664 A1     Jul. 30, 2020

(30) Foreign Application Priority Data

May 18, 2018  (JP) ................................ 2018-096303

(51) Int. Cl.
*C08K 5/527* (2006.01)
*C08K 5/00* (2006.01)
*C08L 23/10* (2006.01)

(52) U.S. Cl.
CPC ............ *C08K 5/527* (2013.01); *C08K 5/0083* (2013.01); *C08L 23/10* (2013.01); *C08K 2201/005* (2013.01); *C08L 2205/24* (2013.01)

(58) Field of Classification Search
CPC .............. C08K 5/527; C08K 5/0083; C08K 2201/005; C08L 23/10; C08L 2205/24
USPC ......................................................... 524/117
See application file for complete search history.

(56) References Cited

U.S. PATENT DOCUMENTS

| | | |
|---|---|---|
| 7,442,735 B2 | 10/2008 | Tobita et al. |
| 10,131,751 B2 | 11/2018 | Lake, Jr. et al. |
| 2003/0236329 A1 | 12/2003 | Kawamoto et al. |
| 2007/0054996 A1 | 3/2007 | Tobita et al. |
| 2014/0179846 A1 | 6/2014 | Lake, Jr. et al. |
| 2017/0088678 A1 | 3/2017 | Lake, Jr. et al. |

FOREIGN PATENT DOCUMENTS

| | | | |
|---|---|---|---|
| EA | 19552 | 4/2014 | |
| EA | 29175 | 2/2018 | |
| EP | 1209190 A1 * | 5/2002 | ............ C08K 5/527 |
| JP | 2001-59040 | 3/2001 | |
| JP | 2003-313444 | 11/2003 | |
| JP | 2004-83852 | 3/2004 | |
| JP | 2005-54036 | 3/2005 | |
| JP | 2005-120237 | 5/2005 | |
| JP | 2007-297465 | 11/2007 | |
| JP | 2017-149962 | 8/2017 | |
| WO | 2010/048108 | 4/2010 | |
| WO | 2014/202604 | 12/2014 | |
| WO | 2015/042561 | 3/2015 | |
| WO | 2017/116767 | 7/2017 | |

OTHER PUBLICATIONS

Official Communication issued in International Application No. PCT/JP2018/037535, dated Nov. 6, 2018.
Decision on Grant in Russian application No. 2019110822/05(020968) dated Oct. 3, 2019.
Search Report in Russian application No. 2019110822/05(020968) dated Sep. 9, 2019.

* cited by examiner

*Primary Examiner* — Hui H Chin
(74) *Attorney, Agent, or Firm* — Greenblum & Bernstein, P.L.C.

(57) ABSTRACT

A particulate nucleating agent of the present invention is a particulate nucleating agent containing an aromatic phosphoric acid ester metallic salt represented by a predetermined expression, in which a range WA of a particle size distribution before packed treatment and a range WB of the particle size distribution after packed treatment satisfy an expression: $0.3 \leq WA/WB \leq 13.5$.

10 Claims, 2 Drawing Sheets

PARTICULATE NUCLEATING AGENT, RESIN COMPOSITION, MOLDED PRODUCT, AND PRODUCTION METHOD THEREOF

TECHNICAL FIELD

The present invention relates to a particulate nucleating agent, a resin composition, a molded product, and a production method thereof.

BACKGROUND ART

As a modification technique of a polymer material, a technique of adding a crystal nucleating agent or a crystallization accelerator is known. As such a kind of technique, a technique disclosed in Patent Document 1 is known, for example. Patent Document 1 discloses that a nucleating agent (hereinafter, the crystal nucleating agent, the crystallization accelerator, and a transparentizing agent are collectively referred to as "nucleating agent") is added to a thermoplastic polymer (claim 1 of Patent Document 1 and the like). In the document, a phosphoric acid ester salt is exemplified as a nucleating agent (paragraph 0014 of Patent Document 1).

RELATED DOCUMENT

Patent Document

[Patent Document 1] Japanese Unexamined Patent Publication No. 2017-149962

SUMMARY OF THE INVENTION

However, as a result of examination by the present inventors, it was determined that there was room for improvement in terms of powder properties in the nucleating agent disclosed in Patent Document 1.

As a result of examination by the present inventors, the following finding was obtained.

A general particulate nucleating agent is added to a thermoplastic resin and melt-kneaded in it as a particulate body, and used in a heating and molding process of the thermoplastic resin. The particulate nucleating agent before use is transferred and stored in a packaged state, after its production. However, in a case of being stored for a long period of time after packaging, there was a concern that powder properties would change in the particulate nucleating agent, and workability or production reliability at the time of heating process would deteriorate.

The present inventors further performed examination and found that it is possible to appropriately control powder properties of an aromatic phosphoric acid ester metallic salt-based particulate nucleating agent by referring to a difference (WA/WB) of particle size distribution before and after the environmental load. As a result of further intensive study based on the finding, the present inventors found that since a change in properties after a predetermined period of time of storage is suppressed by setting WA/WB to be within a predetermined numerical value range, powder properties of the aromatic phosphoric acid ester metallic salt-based particulate nucleating agent is improved, thereby completing the present invention.

According to the present invention, there is provided a particulate nucleating agent including a compound represented by the following General Formula (1), in which a range WA of a particle size distribution measured by the following procedure A and a range WB of a particle size distribution measured by the following procedure B satisfy the following Expression (I).

$$0.3 \leq WA/WB \leq 13.5 \quad \text{Expression (I)}$$

(Procedure A)

Dispersion air of a dispersion pressure of 30 psi is blown to the particulate nucleating agent, and dry type measurement is performed on the particle size distribution of the particulate nucleating agent, setting the particulate nucleating agent dispersed in air as a measurement target, using a laser diffraction particle size measurement device.

As the particle size distribution, a volume mean particle size MvA and a number mean particle size MnA of the particulate nucleating agent are obtained.

Based on WA=MvA/MnA, the range WA of the particle size distribution is calculated.

(Procedure B)

Packed treatment is performed on the particulate nucleating agent set as the measurement target of the procedure A in the following manner.

Packed treatment: the particulate nucleating agent is put in a tray made of an aluminum foil, and in a state in which a load of 60 g/cm² is added to the particulate nucleating agent in the tray, the tray is left still in a constant-temperature oven having a relative humidity of 80% at 40° C. for 24 hours.

Subsequently, without blowing dispersion air to the particulate nucleating agent, dry type measurement is performed on the particle size distribution of the particulate nucleating agent, setting the particulate nucleating agent after packed treatment dispersed in the air as the measurement target, using the laser diffraction particle size measurement device.

As the particle size distribution, a volume mean particle size MvB and a number mean particle size MnB of the particulate nucleating agent are obtained.

Based on WB=MvB/MnB, the range WB of the particle size distribution is calculated.

(1)

(In the above General Formula (1), $R^1$ to $R^4$ each independently represent a hydrogen atom and a straight chain or branched alkyl group having 1 to 9 carbon atoms, $R^5$ represents a hydrogen atom or an alkyl group having 1 to 4 carbon atoms, m represents 1 or 2, in a case where m is 1, $M^1$ represents a hydrogen atom or an alkali metal atom, and in a case where m is 2, $M^1$ represents a group 2 element, Al (OH) or Zn.)

In addition, according to the present invention, a resin composition includes a thermoplastic resin including the particulate nucleating agent is provided.

In addition, according to the present invention, a molded product obtained by using the resin composition is provided.

In addition, according to the present invention, a production method of producing a molded product by using the resin composition is provided.

According to the present invention, a particulate nucleating agent excellent in powder properties, a resin composition using thereof, a molded product, and a production method thereof are provided.

BRIEF DESCRIPTION OF THE DRAWINGS

The object, other objects thereof, features, and advantages become further apparent by appropriate embodiments described below and the following drawings accompanied thereto.

DESCRIPTION OF EMBODIMENTS

A particulate nucleating agent of the present embodiment is described.

The particulate nucleating agent contains an aromatic phosphoric acid ester metallic salt. As the aromatic phosphoric acid ester metallic salt, a compound represented by the following General Formula (1) is used. The compound may be used alone, or two or more thereof may be used by being combined together.

(1)

In the above following General Formula (1), $R^1$ to $R^4$ each independently represents a hydrogen atom, a straight chain or branched alkyl group having 1 to 9 carbon atoms, $R^5$ represents a hydrogen atom or an alkyl group having 1 to 4 carbon atoms, m represents 1 or 2, in a case where m is 1, $M^1$ represents a hydrogen atom or an alkali metal atom, and in a case where m is 2, $M^1$ represents a group 2 element, Al (OH) or Zn.

Examples of an alkyl group having 1 to 9 carbon atoms represented by $R^1$, $R^2$, $R^3$, and $R^4$ in the following General Formula (1) include a methyl group, an ethyl group, a propyl group, an isopropyl group, a butyl group, a sec-butyl group, a tert-butyl group, an isobutyl group, an amine group, an isoamyl group, a tert-amyl group, an hexyl group, a cyclohexyl group, a heptyl group, an isoheptyl group, and a tert-heptyl group.

In the following General Formula (1), examples of an alkali metal represented by $M^1$ include sodium (Na), potassium (K), lithium (Li), and the like.

Examples of a group 2 element represented by $M^1$ in the following General Formula (1) include beryllium (Be), magnesium (Mg), Calcium (Ca), strontium (Sr), Barium (Ba), and Radium (Ra), and among these, magnesium and calcium are preferable since the nucleating agent effect of nucleating agent components is prominent.

Among the compounds represented by the following General Formula (1), a compound in which m is 1 is preferable. In addition, a compound in which $R^1$, $R^2$, $R^3$, and $R^4$ contain one group selected from the group consisting of a methyl group, an ethyl group, a sec-butyl group, and a tert-butyl group is preferable. In addition, a compound in which $R^5$ is a hydrogen atom or a methyl group is particularly preferable.

As the compound represented by the following General Formula (1), chose containing one or two or more compounds represented by any one of the following chemical formulae (2) to (13) are preferable. Among these, from a viewpoint of improving physical properties of a resin, a compound represented by any one of chemical formulae (2) to (6) is preferable. From a viewpoint of improving transparency, a compound represented by any one of chemical formulae (7) to (13) is preferable.

As a method of producing the compound represented by the General Formula (1), phosphorus trichloride (or phosphorus oxychloride) is reacted with 2,2'-alkylidene phenol, and the hydrolysis is performed depending on the necessity to produce a cyclic acid phosphate. Subsequently, the cyclic acid phosphate is reacted with a metal hydroxide such as sodium hydroxide and potassium hydroxide, the obtained reactant is appropriately refined (filtered and the like) and dried to obtain the compound (aromatic phosphate metal salt). In addition, the aromatic phosphate metal salt may be synthesized by a known method in the related art and used as the compound.

In addition, the obtained compound is dissolved in a solvent, reacted with other metal hydroxides such as lithium hydroxide, or reacted with any salt of aluminum, magnesium, and a group 2 element, and the obtained reactant is refined and dried to obtain another compound.

A particulate nucleating agent of the present embodiment is obtained by pulverizing the obtained compound using appropriate pulverizing means, depending on the necessity. In the particulate nucleating agent, coarse particles may be removed by being sieved with a sieve of a predetermined mesh size. In addition, the particulate nucleating agent may include one or two or more powdery compounds. For example, two or more compounds having different particle size distribution, or classified two or more compounds may be combined and blended with one another at an appropriate proportion to obtain the particulate nucleating agent.

Examples of the pulverizing means include mortar, ball mill, rod mill, tube mill, conical mill, vibratory ball mill, Hyswing ball mill, roller mill, pin mill, hammermill, attrition mill, jet mill, jet miser, micronizer, nanomiser, majac mill, micro-atomizer, colloid mill, premier colloid mill, micron mill, Charlotte colloid mill, rotary cutter, dry medium stirring medium, and the like. These pulverizing machines may be used alone or two or more may be used in combination. In addition, these machines are appropriately selected depending on the type of the raw material powders to be pulverized, the pulverizing time, and the like.

The particulate nucleating agent of the present embodiment may be constituted of only the compound represented by General Formula (1), or may contain other components within a range of achieving the object of the present invention. Examples of the other components include aromatic phosphate ester metal salts other than the compound represented by General Formula (1), fatty acid metal salts, silicic acid-based inorganic additive components, hydrotalcites, and the like. These may be used alone or two or more may be used by being combined together.

As the fatty acid metal salt, those containing a compound represented by the following General Formula (14) are preferable.

(14)

In General Formula (14), $R^6$ represents a straight chain or branched aliphatic group having 9 to 30 carbon atoms, M represents a metal atom, and n represents an integer of 1 to 4, which is an integer corresponding to the valence of metal atoms of M.

In General Formula (14), $R^6$ is a straight chain or branched aliphatic group having 9 to 30 carbon atoms, and examples thereof include an alkyl group and an alkenyl group having 9 to 30 carbon atoms. This may be substituted with a hydroxyl group.

Examples of the aliphatic group having 9 to 30 carbon atoms include saturated fatty acids such as capric acid, 2-ethylhexane acid, undecylic acid, lauric acid, tridecylic acid, myristic acid, pentadecylic acid, palmitic acid, margaric acid, stearic acid, nonadecylic acid, arachidic acid, hexosyl acid, behenic acid, tricosylic acid, lignoceric acid, cerotic acid, montanoic acid, and melissic acid, straight chain unsaturated fatty acids such as 4-decenoic acid, 4-dodecenoic acid, palmitoleic acid, α-linoleic acid, linoleic acid, γ-linolenic acid, stearidonic acid, petroselinic acid, oleic acid, elaidic acid, vaccenic acid, eicosapentaenoic acid, docosapentaenoic acid, and docosahexaenoic acid, and the like.

In the aliphatic acid metal salt, an aliphatic group represented by $R^6$ preferably has 10 to 21 carbon atoms. In particular, lauric acid, myristic acid, palmitic acid, stearic acid, behenic acid, oleic acid, and 12-hydroxy stearic acid are preferable.

Examples of metal atom represented by M include alkali metal, magnesium, calcium, strontium, barium, titanium, manganese, iron, zinc, silicon, zirconium, yttrium, barium, hafnium, or the like. Among these, alkali metal such as sodium, lithium, and potassium is preferable, and in particular, sodium and lithium are preferably used since the crystallization temperature thereof is high.

Examples of the silicic acid-based inorganic additive components include fumed silica, particulate silica, silica stone, diatomaceous earth, clay, kaoline, silica gel, calcium silicate, sericite, kaolinite, flint, feldspar flour, vermiculite, attapulgite, talc, mica, minnesotite, pyrophyllite, and the like, and among these, those of which particle structure is a layer-like structure and of which silicon content is 15% by mass or more are preferable. Examples of the preferable inorganic additive include sericite, kaolinite, talc, mica, minnesotite, pyrophyllite, and the like, and talc and mica are more preferable.

The hydrotalcites may be natural products or synthetic products, and may be used regardless of presence or absence of surface treatment or presence or absence of water of crystallization. Examples of the hydrotalcites include basic carbonate represented by the following General Formula.

(In General Formula, M represents alkali metal or zinc, X represents a number of 0 to 6, y represents a number of 0 to 6, z represents a number of 0.1 to 4, p represents the valence of M, and n represents a number of 0 to 100 of water of crystallization)

The particulate nucleating agent containing the other components is a particulate nucleating agent composition containing the compound represented by General Formula (1), and is obtained by being constituted to contain one or more selected from the group consisting of other aromatic phosphate ester metal salts, fatty acid metal salts, silicic acid-based inorganic additive components, and hydrotalcites, preferably one or more selected from the group consisting of fatty acid metal salts, talc, mica, and hydrotalcites.

Such a particulate nucleating agent is obtained by performing pulverization treatment by appropriately combining the pulverizing means in the co-presence of the compound represented by General Formula (1) and other components, for example. In addition, the pulverizing means, sieving, blending method, and the like may be used.

The particulate nucleating agent of the present embodiment functions as a nucleating agent and a transparentizing agent added at the time of molding process of a thermoplastic resin such as a crystalline polymer. In the crystalline polymer, it is possible to realize improvement (modifying effect) in the crystallization temperature, the thermal modification temperature, the bending elastic modulus, the hardness, the transparency, and the like. In addition, it is possible to enhance molding cycle properties and to improve productivity.

In the particulate nucleating agent of the present embodiment, the range WA of the particle size distribution measured by the following procedure A and the range WB of the particle size distribution measured by the following procedure B satisfy the following Expression (I).

$$0.3 \leq WA/WB \leq 13.5 \qquad \text{Expression (I)}$$

(Procedure A)

Dispersion air of a dispersion pressure of 30 psi is blown to the particulate nucleating agent, and dry type measurement is performed on the particle size distribution of the particulate nucleating agent, having the particulate nucleating agent dispersed in the air as a measurement target, using a laser diffraction particle size measurement device.

As the particle size distribution, a volume mean particle size MvA and a number mean particle size MnA of the particulate nucleating agent are obtained.

Based on WA=MvA/MnA, the range WA of the particle size distribution is calculated.

(Procedure B)

Packed treatment is performed on the particulate nucleating agent as a measurement target of the procedure A in the following manner.

Packed treatment: the particulate nucleating agent is put in a tray made of an aluminum foil, and in a state in which a load of 60 g/cm² is added to the particulate nucleating agent in the tray, the tray is left still in a constant-temperature oven having a relative humidity of 80% at 40° C. for 24 hours.

Subsequently, without blowing dispersion air in the particulate nucleating agent, dry type measurement is performed on the particle size distribution of the particulate nucleating agent, having the particulate nucleating agent after packed treatment dispersed in the air as a measurement target, using a laser diffraction particle size measurement device.

As the particle size distribution, a volume mean particle size MvB and a number mean particle size MnB of the particulate nucleating agent are obtained.

Based on WB=MvB/MnB, a range WB of the particle size distribution is calculated.

According to the finding of the present inventors, it was determined that by imparting an environmental load for which weighting (pressure), heating (temperature), humidifying (humidity) are appropriately selected to the particulate nucleating agent for a predetermined time, it is possible to evaluate powder properties of the particulate nucleating agent when a predetermined time elapses from immediately after production to before use.

Such an environmental load can be used as a condition of an acceleration test, and the acceleration test makes it possible to evaluate how the powder properties of the particulate nucleating agent after its production change after a predetermined time elapses due to transfer, storage, and the like.

In addition, as a result of examination, it was found that by having a degree of change in the range of the particle size distribution before and after packed treatment, that is, WA/WB as a reference, using the packed treatment as the environmental load, it is possible to appropriately control particle properties of the particulate nucleating agent. Through a further intensive study based on such a finding, knowledge was obtained that the powder property change after the environmental load is suppressed and the powder property change after storage for a predetermined period is suppressed by setting WA/WB to be within the numerical value range of Expression (I), and thus the powder properties of the particulate nucleating agent are improved.

In addition, according to the finding of the present inventors, it was recognized that it is possible to reliably measure the particle size distribution of the powder with a wide range of size from fine powder to coarse powder, immediately after the production, by employing measurement conditions of imparting an appropriate dispersion pressure to the particulate nucleating agent. In addition, it was recognized that it is possible to reliably measure the particle size distribution of the particulate nucleating agent of which the powder after the environmental load, that is, after the packed treatment is impacted by the environmental load such as aggregation and the like by employing measurement conditions not imparting a dispersion pressure to the particulate nucleating agent.

In addition, it is possible to enhance measurement reliability by employing a dry condition since the dry condition has fewer problems such as bubbles than a wet condition.

In the present embodiment, a lower limit value of the WA/WB is equal to or more than 0.3, preferably equal to or more than 0.5, and more preferably equal to or more than 0.7. With this, it is possible to suppress a change in properties such as dust properties and feed reliability with the elapse of time. On the other hand, an upper limit value of the WA/WB is equal to or less than 13.5, preferably equal to or less than 13.0, and more preferably equal to or less than 12.7. With this, it is possible to suppress a change in dust properties with the elapse of time. In addition, by setting the value to be within such a numerical value range, it is possible to suppress a change in fluidity with the elapse of time and it is possible to enhance transparency of a crystalline polymer.

In addition, as the particulate nucleating agent of the present embodiment, those satisfying the following Expression (II) can be used.

$$3 \leq WA \leq 45 \qquad \text{Expression (II)}$$

In Expression (II), the lower limit value of WA is not particularly limited, but is equal to or more than 3, preferably equal to or more than 4, and more preferably equal to or more than 5, for example. With this, it is possible to suppress a change in powder properties with the elapse of time. On the other hand, an upper limit value of the WA is equal to or less than 45, for example, and from a viewpoint of further enhancing transparentizing properties, is preferably equal to or less than 35, and more preferably equal to or less than 30. In addition, by setting the WA to be equal to or less than 30, it is possible to suppress occurrence of fish eye and the like when forming a resin composition containing the particulate nucleating agent into a film, and thus it becomes possible to enhance production reliability of a molded product.

In the volume mean particle size MvA, a lower limit value may be equal to or more than 2 μm, preferably equal to or more than 3 μm, and more preferably equal to or more than 5 μm, for example, and an upper limit value may be equal to or less than 55 μm, preferably equal to or less than 50 μm, and more preferably equal to or less than 45 μm, for example.

In addition, in the number mean particle size MnA, a lower limit value may be equal to or more than 0.5 μm, preferably equal to or more than 0.9 μm, and more preferably equal to or more than 1.0 μm, for example, and an upper limit value may be equal to or less than 2.5 μm, preferably equal to or less than 2.0 μm, and more preferably equal to or less than 1.5 μm, for example.

In the present embodiment, it is possible to control the WA/WB and WA by appropriately selecting the type or mixture amount of each component contained in the particulate nucleating agent, a preparation method of the particulate nucleating agent, and the like, for example. Among these, examples of elements for setting the WA/WB and WA to be in a desired numerical value range include pulverizing conditions such as a pulverizing method or pulverizing time, classification conditions such as cutting of coarse particles, blending conditions, and the like.

The resin composition of the present embodiment contains the particulate nucleating agent in a thermoplastic resin.

A method of adding the particulate nucleating agent to the thermoplastic resin is not limited, and a generally used method may be applied as it is. For example, it is possible to use a method of dry blending a powder product or pellet of the thermoplastic resin and a powder product of the particulate nucleating agent together.

The resin composition may be used in various forms. For example, the form may be any of pellet form, granule form, and powder form. From a viewpoint of handleability, the pellet form is preferable.

Examples of the thermoplastic resin include a polyolefin-based resin, a styrene-based resin, a polyester-based resin, a polyether-based resin, a polycarbonate-based resin, a polyamide-based resin, a halogen-containing resin, and the like. Among these, a crystalline polymer is preferably used.

In addition, examples of the thermoplastic resin include a thermoplastic resin such as petroleum resin, coumarone resin, polyvinyl acetate, acrylic resin, polymethyl methacrylate, polyvinyl alcohol, polyvinyl formal, polyvinyl butyral, polyphenylene sulfide, polyurethane, fibrous resin, polyimide resin, polysulfone, liquid crystal polymer, and the like and the blended product thereof.

In addition, the thermoplastic resin may be a thermoplastic elastomer such as isoprene rubber, butadiene rubber, acrylonitrile-butadiene copolymer rubber, styrene-butadiene copolymer rubber, polyester-based elastomer, nitrile elastomer, nylon elastomer, vinyl chloride elastomer, polyamide elastomer, polyurethane elastomer, and the like, or these may be used in combination.

The crystalline polymer is not particularly limited, and examples thereof include a polyolefin-based polymer such as polypropylene, high-density polyethylene, low-density polyethylene, straight chain low-density polyethylene, polybutene-1, poly3-methylpentene, poly4-methylpentene, α-olefin polymer such as ethylene/propylene block or random copolymer, and the like; thermoplastic straight chain polyester-based polymer such as polyethylene terephthalate, polybutylene terephthalate, polyhexamethylene terephthalate, and the like; polysulfide-based polymer such as polyphenylene sulfide and the like; polylactic acid-based polymer such as polycaprolactone and the like; straight chain polyamide-based polymer such as polyhexamethylene adipamide and the like; crystalline polystyrene-based polymer such as syndiotactic polystyrene and the like; and the like.

Among these, the polyolefin-based polymer which prominently exhibits the use effect of the nucleating agent of the present invention is preferable, and a polypropylene-based resin such as polypropylene, ethylene/propylene block or random copolymer, α-olefin/propylene block or random copolymer other than ethylene, a mixture of the propylene-based polymer and other α-olefin polymer, and the like is particularly preferable.

The polypropylene-based polymer is useful in a case where the crystalline α-olefin polymer, particularly, a polypropylene-based resin such as polypropylene, ethylene/propylene copolymer, and a mixture of the propylene polymer and other α-olefin polymer is used as the crystalline polymer. The polypropylene-based resin may be used regardless of the extreme viscosity, the isometactic pentad fraction, the density, the molecular weight distribution, the melt flow rate, the rigidity, and the like. For example, the polypropylene-based resin may be also appropriately used as disclosed in Japanese Unexamined Patent Publication No. 63-37148, Japanese Unexamined Patent Publication No. 63-37152, Japanese Unexamined Patent Publication No. 63-90552, Japanese Unexamined Patent Publication No. 63-210152, Japanese Unexamined Patent Publication No. 63-213547, Japanese Unexamined Patent Publication No. 63-243150, Japanese Unexamined Patent Publication No. 63-243152, Japanese Unexamined Patent Publication No. 63-260943, Japanese Unexamined Patent Publication No. 63-260944, Japanese Unexamined Patent Publication No. 63-264650, Japanese Unexamined Patent Publication No. 1-178541, Japanese Unexamined Patent Publication No. 2-49047, Japanese Unexamined Patent Publication No. 2-102242, Japanese Unexamined Patent Publication No. 2-251548, Japanese Unexamined Patent Publication No. 2-279746, Japanese Unexamined Patent Publication No. 3-195751, and the like.

A content of the particulate nucleating agent may be generally within a range of 0.001 to 10 parts by weight, preferably 0.005 to 8 parts by weight, and more preferably 0.01 to 5 parts by weight, with respect to 100 parts by weight of the thermoplastic resin (for example, crystalline polymer). With this, it is possible to sufficiently obtain the effect of modifying the thermoplastic resin, particularly the crystalline polymer.

The resin composition of the present embodiment may contain an additive such as anti-oxidant, photostabilizer, ultraviolet absorbing agent, pigment, filler, organic tin compound, plasticizer, epoxy compound, foaming agent, anti-static agent, flame retardant, lubricant, heavy metal inert agent, hydrotalcites, organocarboxylic acid, coloring agent, silicic acid-based additive, and processing aid. These may be used alone or two or more thereof may be used in combination.

Examples of the anti-oxidant include a phosphorus-based anti-oxidant, a phenol-based anti-oxidant, a thioether-based anti-oxidant, a phosphite-based anti-oxidant, and the like.

Examples of the anti-static agent include a cationic surfactant, an anionic surfactant, a nonionic surfactant, an ampholytic surfactant, and the like.

Examples of the flame retardant include a halogen-based compound, a phosphate ester compound, a phosphate amid compound, a melamine-based compound, a melamine salt compound of polyphosphate, a fluorine resin, or a metal oxide, and the like.

Examples of the lubricant include a hydrocarbon-based lubricant, a fatty acid-based lubricant, an aliphatic alcohol-based lubricant, an aliphatic ester-based lubricant, an aliphatic amide-based lubricant, a metal soap-based lubricant, and the like.

Examples of the silicic acid-based additive include fume silica, fine particle silica, silica stone, diatomaceous earth, clay, kaoline, silica gel, calcium silicate, sericite, kaolinite, flint, feldspar flour, vermiculite, attapulgite, talc, mica, minnesotite, pyrophyllite, and the like.

A content of the additive in the resin composition is preferably 0.001 to 10 parts by weight, for example, with respect to 100 parts by weight of a crystalline polymer. By setting the content of the additive to be within such a numerical value range, the effect of the additive is improved.

The resin composition may be used in a molded product such as injection molded product, fiber, flat yarn, biaxially stretched film, uniaxially stretched film, non-stretched film, sheet, thermoformed product, extrusion blow-molded product, injection blow-molded product, injection stretching blow-molded product, profile extrusion-molded product, rotationally molded product, and the like. Among these, the injection molded product, the film, the sheet, and the thermoformed product are preferable as the molded product.

The method of producing the molded product of the present embodiment includes a step of molding a resin composition based on various molding methods. With this, it is possible to obtain the molded product.

The molding method is not particularly limited, and examples thereof include an injection molding method, an extrusion molding method, a blow molding method, a rotational molding method, a vacuum molding method, an inflation molding method, a calender molding method, a slush molding method, a dipmolding method, a foaming molding method, and the like. Among these, the injection molding method, the extrusion molding method, and the blow molding method are preferable.

The resin composition may be used in various uses such as construction materials, agricultural materials, components for vehicles such as automobiles, trains, ships, aircraft and the like, packaging materials, miscellaneous goods, toys, home appliances, medical supplies, and the like. Specifically, automobile components such as bumper, dashboard, instrument panel, battery case, luggage case, door panel, door trim, fender liner, and the like; resin components for home appliances such as refrigerator, washing machine, vacuum cleaner, and the like; household goods such as tableware, bottle cap, bucket, bathing article, and the like; resin components for connection such as connector and the like; miscellaneous goods such as toys, storage containers, synthetic paper, and the like; medical molded products such as medical pack, syringe, catheter, medical tube, syringe preparation, infusion solution bag, reagent container, medicine container, medicine unit packaging, and the like; building materials such as wall material, floor material, window frame, wall paper, window, and the like; wire coating materials; agricultural materials such as house, tunnel, flat yarn mesh bag, and the like; industrial materials such as pallet, pail can, backgrind tape, tape for liquid crystal protection, pipe, modified silicone polymer for sealing material, and the like; food packaging materials such as wrap, tray, cup, film, bottle, cap, preservation container, and the like; other 3D printer materials, separator film for battery, and the like. In addition, the resin composition may be used in uses in a case where various post-treatments are performed, for example, uses in a case where sterilization by radiation is performed such as medial use and food packaging use, uses in a case where low-temperature plasma treatment and the like are performed after molding in order to improve surface properties such as coating properties, or the like. Among these, the resin composition is preferably used in automobile components, household goods, and food packaging materials.

Examples

Hereinafter, the present invention will be described in detail with reference to examples. However, the present invention is not limited to the descriptions of the examples.

Synthesis of Compound

Synthesis of Compound No. 1

486 g (1 mol) of hydroxy-2,2'-methylene bis(4,6-di-t-butylphenyl)phosphate, an aqueous solution of 40 g (1 mol) of sodium hydroxide, and methanol were prepared and stirred at room temperature for 1 hour. The resultant product was dried under reduced pressure to obtain Compound No. 1 of 421 g of white powders.

Compound No. 1

The obtained Compound No. 1 was sieved with a sieve (mesh size: 57 μm) without pulverization treatment to obtain a particulate nucleating agent A.

The obtained Compound No. 1 was pulverized using a ball mill for 30 minutes, and sieved with a sieve (mesh size: 57 μm) to obtain a particulate nucleating agent B.

The obtained Compound No. 1 was pulverized using a ball mill for 4 hours, and further pulverized using a jet mill to obtain a particulate nucleating agent C.

Production of Particulate Nucleating Agent

Test Example 1

The particulate nucleating agent A and the particulate nucleating agent C were mixed with each other at a mass ratio: 8.5/1 to obtain a particulate nucleating agent D.

Test Example 2

The particulate nucleating agent A and the particulate nucleating agent C were mixed with each other at a mass ratio: 4/1 to obtain a particulate nucleating agent E.

Test Example 3

The particulate nucleating agent A and the particulate nucleating agent C were mixed with each other at a mass ratio: 1/1 to obtain a particulate nucleating agent F.

Test Example 4

The particulate nucleating agent B and the particulate nucleating agent C were mixed with each other at a mass ratio: 1/1 to obtain a particulate nucleating agent G.

Test Example 5

The particulate nucleating agent A and the particulate nucleating agent C were mixed with each other at a mass ratio: 9/1 to obtain a particulate nucleating agent H.

Test Example 6

The particulate nucleating agent C was used as it was.
<Particle Size Distribution Measurement>

Figure 1A:
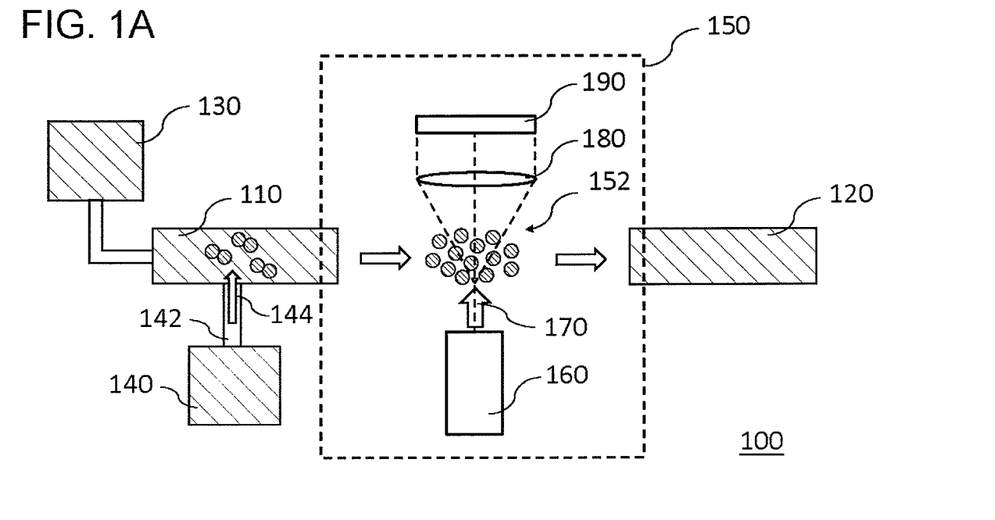
FIGS. 1A and 1B are drawings for describing a gist of a measurement principle of a laser diffraction particle size measurement device.
Figure 1B:
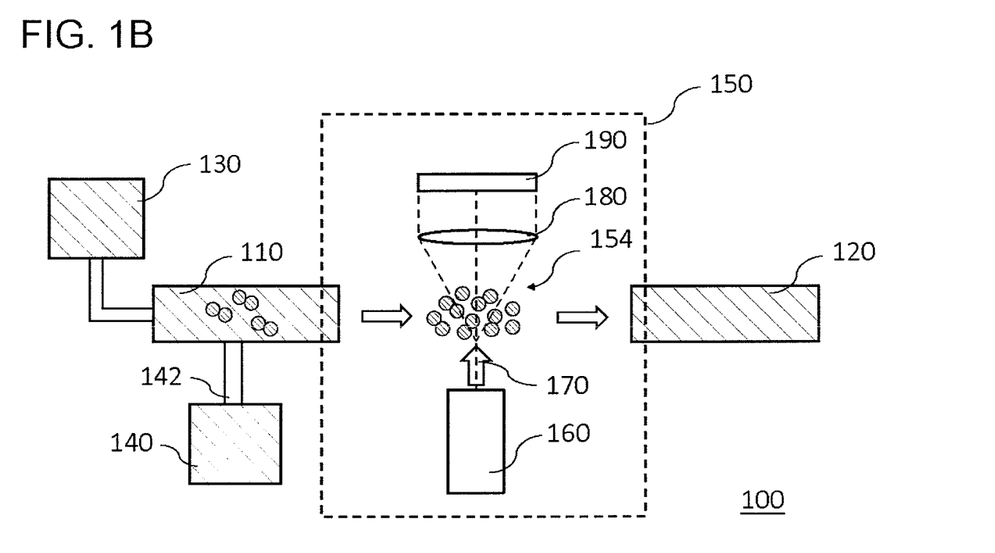

The particle size distribution of the obtained particulate nucleating agent of each test example was measured by the following procedures A and B. In the measurement of the particle size, Microtrac MT3000II (manufactured by Microtrac Bell Co., Ltd.) as a laser diffraction particle size measurement device. FIGS. 1A and 1B show a gist of measurement principle of a laser diffraction particle size measurement device 100.

Procedure A (Particle Size Distribution Before Packed Treatment):

First, the obtained particulate nucleating agent (sample) was set in a sample holder 130 shown in FIG. 1A, and the inside of a measurement unit 150 was adsorbed by an adsorption nozzle 120. Subsequently, a compression air supplied from a compressor 140 (disperser) was adjusted and blown in a dispersion air supply unit 110 through an emission nozzle 142. At this time, a dispersion air 144 was blown to a particulate nucleating agent passing through the dispersion air supply unit 110 in the following condition of dispersion pressure, and a particulate nucleating agent 152 (measurement target) was dispersed in an air inside the measurement unit 150 so as to pass through a laser beam 170 radiated from a light source 160. After that, the particulate nucleating agent 152 was adsorbed into the adsorption nozzle 120.

In the measurement unit 150, a light diffused by the particulate nucleating agent 152 dispersed in the air was measured using a detector 190 via a condenser lens 180. A particle size distribution of the particulate nucleating agent 152 was obtained based on the measurement result (high-dispersion-type dry type measurement).

In the procedure A, a dispersion pressure (air pressure of the dispersion air 144 blown to the sample) was set to 30 psi (2.1 kgf/cm$^2$). In addition, as the light source, two laser beams 170 having the same wavelength were used, and a condition for enhancing resolution was employed.

In the particle size distribution of the obtained particulate nucleating agent 152, a volume mean particle size was set to MvA and a number mean particle size was set to MnA, and a range WA of the particle size distribution was calculated based on an expression: WA=MvA/MnA. The result is shown in Table 1.

Figure 2:
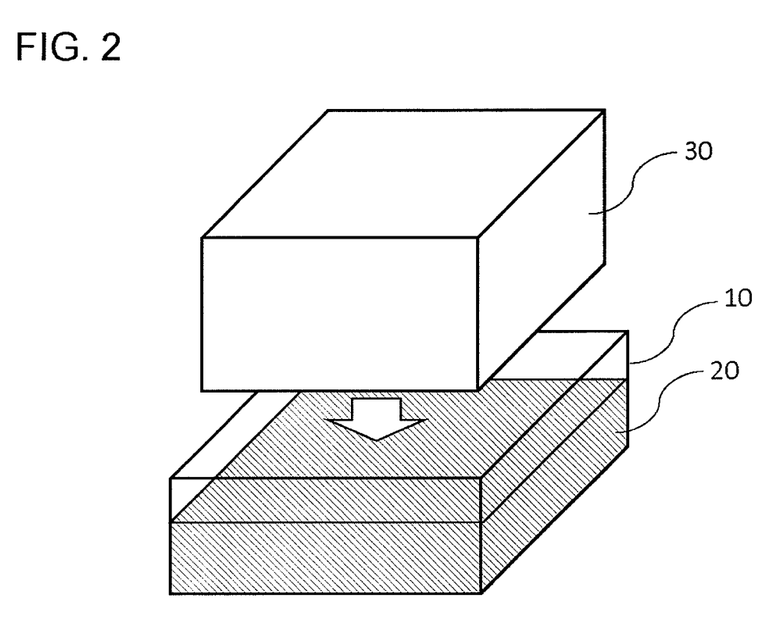
FIG. 2 is a drawing for describing a procedure of packed treatment.

Procedure B (Particle Size Distribution after Packed Treatment):

Packed treatment was performed on the particulate nucleating agent as a measurement target of the procedure A based on the procedure shown in FIG. 2.

First, a tray 10 made of an aluminum foil (width: 50 mm, depth: 60 mm, height: 20 mm) was prepared, and 13 g of a particulate nucleating agent (sample 20) was filled in the tray 10. A weight 30 made of lead (mass: 1.8 kg, contact area: 30 cm$^2$) was disposed on the sample 20, and in a state of imparting a load of 60 g/cm$^2$ to the sample 20, the tray 10 was left still in a constant-temperature oven having a relative humidity of 80% at 40° C. for 24 hours (packed treatment).

Subsequently, the sample 20 after packed treatment taken out of the tray 10 was set in a sample holder 130 shown in FIG. 1B, and the inside of the measurement unit 150 was adsorbed by the adsorption nozzle 120. Subsequently, a particulate nucleating agent 154 (measurement target) scattered from the dispersion air supply unit 110 was dispersed in the air by an adsorption pressure (negative pressure) of the adsorption nozzle 120 so as to pass through the laser beam 170 discharged from the light source 160. At this time, subsequently, a compression air was not supplied from the compressor 140 (disperser). After that, the particulate nucleating agent 154 was recovered in the adsorption nozzle 120.

In the measurement unit 150, a light scattered by the particulate nucleating agent 154 dispersed in the air was measured using the detector 190 through the condenser lens 180. A particle size distribution of the particulate nucleating agent 154 was obtained based on the measurement result (non-dispersion-type dry type measurement).

In the procedure B, a dispersion pressure (air pressure of the dispersion air 144 blown to the sample) was set to 0 psi without using the compressor 140 (disperser). In addition, as the light source, two laser beams 170 having the same wavelength were used, and a condition for enhancing resolution was employed. An adsorption pressure of the adsorption nozzle 120 was the same as that of the procedure A.

In the particle size distribution of the obtained particulate nucleating agent 154, a volume mean particle size was set to MvB and a number mean particle size was set to MnB, and a range WB of the particle size distribution was calculated based on an expression: WB=MvB/MnB. The result is shown in Table 1.

TABLE 1

|  | Test Example 1 | Test Example 2 | Test Example 3 | Test Example 4 | Test Example 5 | Test Example 6 |
|---|---|---|---|---|---|---|
| Particulate nucleating agent | D | E | F | G | H | C |
| WA/WB | 13.1 | 3.4 | 3.0 | 0.6 | 13.9 | 0.2 |
| WA | 42.7 | 40.2 | 32.6 | 7.4 | 37.7 | 2.1 |

In view of the result of the particle size distribution, the obtained particulate nucleating agents D to G of the Text Examples 1 to 4 were used as the particulate nucleating agents of Examples 1 to 4 and the obtained particulate nucleating agents H and C of the Test Examples 5 and 6 were used as the particulate nucleating agents of Comparative Examples 1 and 2, based on "WA/WB".

Evaluation was performed on the particulate nucleating agent of each example and each comparative example based on the following evaluation items.

(Compression Measurement)

Compression was measured using a loose density (g/cm$^3$) and a firm density (g/cm$^3$) of the obtained particulate nucleating agent by using a powder property evaluation device (manufactured by Seishin Corporation, Multi-tester MT-02). From the obtained result, compression (%) was calculated based on Compression (%)=[("firm density"−"loose density")/"firm density"]×100.

(Dispersion)

Dispersion (%) of the obtained particulate nucleating agent was measured by using the powder property evaluation device (manufactured by Seishin Corporation, Multi-tester MT-02).

(Discharge Time)

10 g of the obtained particulate nucleating agent was filled in a feeder of the powder property evaluation device, and a discharge time (s) at the time of vibration under a condition of a feeder vibration width of 0.3 mm was estimated by using the powder property evaluation device (manufactured by Seishin Corporation, Multi-tester MT-02).

In the compression, dispersion, and discharge rate, a sample a prepared by the following procedure a and a sample b prepared by the following procedure b were used as particulate nucleating agents which are measurement targets. The compression, dispersion, and discharge rate were measured by using three samples prepared by the procedure a, and an average value of the three was set as a measurement value. The same was done regarding the sample b prepared by the procedure b.

(Procedure a)

The particulate nucleating agent immediately after preparation was set as the measurement target (sample a). However, in a case of measuring the compression, the particulate nucleating agent having passed a test sieve of 710 μm was set as the measurement target (sample a).

(Procedure b)

A particulate nucleating agent obtained by subjecting the particulate nucleating agent as a measurement target of the procedure a to the same packed treatment as that described in the procedure B was set as the measurement target (sample b).

<Fluidity Properties>

From the measured compression, compression change rate between the procedure a and the procedure b=|(compression of sample b−compression of sample a)/compression of sample a|×100(%) was calculated, and the obtained compression change rate before and after packed treatment was evaluated based on the following evaluation criteria. The result is shown in Table 3.

<Dust Properties>

From the measured dispersion, dispersion change rate between the procedure a and the procedure b=|(dispersion of sample b−dispersion of sample a)/dispersion of sample a|×100(%) was calculated, and the obtained dispersion change rate before and after packed treatment was evaluated based on the following evaluation criteria. The result is shown in Table 2.

<Feed Reliability>

Evaluation was performed on each of the measured discharge time a (s) of the sample a and discharge time b (s) of the sample b based on the following evaluation criteria. The result is shown in Table 2.

Evaluation was performed on the compression change rate, dispersion change rate, and discharge time based on the following criteria. The result is shown in Table 2.

Compression Change Rate

1: Change rate was small, property change of fluidity was small.

2: Change Rate was relatively large, but property change of fluidity was within a range in which there was no practical problem.

3: Change rate was large, and property change of fluidity was large.

Dispersion Change Rate

1: Change rate was small, and property change of dust properties was small.

2: Change rate was relatively large, but property change of dust properties was within a range in which there was no practical problem.

3: Change rate was large, and property change of dust properties was large.

Discharge Time

1: discharge time a and discharge time b were small, and feed reliability was favorable.

2: Discharge time a was small and discharge time b was relatively large, but operation stop did not occur. Therefore, feed reliability was within a range in which there was no practical problem.

3: During measurement of the discharge time a or discharge time b, operation stop occurred after the elapse of a predetermined time. Therefore, feed reliability deteriorated.

TABLE 2

|  | Example 1 | Example 2 | Example 3 | Example 4 | Comparative Example 1 | Comparative Example 2 |
|---|---|---|---|---|---|---|
| Particulate nucleating agent | D | E | F | G | H | C |
| Dust properties | 2 | 1 | 1 | 1 | 3 | 3 |
|  | 17.4% | 3.4% | 4.5% | 0.6% | 38.3% | 41.8% |
| Feed reliability | 1 | 1 | 2 | 1 | 1 | 3 |
| Discharge time a | 11 s | 15 s | 19 s | 13 s | 12 s | 12 s |
| Discharge time b | 19 s | 19 s | 58 s | 11 s | 10 s | >30 |

In Table 2, ">30" represents that no discharge occurred after 30 seconds and operation stopped.

TABLE 3

|  | Example 1 | Example 2 | Example 3 | Example 4 |
|---|---|---|---|---|
| Particulate nucleating agent | D | E | F | G |
| Fluidity properties | 1 | 1 | 2 | 2 |
|  | 9.6% | 10.4% | 12.2% | 10.8% |

<Transparentizing Properties>

A composition obtained by mixing 0.1 parts by weight of the obtained particulate nucleating agent of each example with 100 parts by weight of polypropylene using a Henschel mixer for 1 minute, and extrusion processed under a condition of 230° C. and 150 rpm to produce a pellet. Haze (haze value: %) of a test piece having a thickness of 1 mm obtained by injection molding the resultant product at 200° C. was measured based on JIS K7136.

The particulate nucleating agents of Examples 1 to 4 are excellent in dust properties compared to those of Comparative Example 1 and are excellent in dust properties and feed reliability compared to Comparative Example 2, and thus it was recognized that powder property change was suppressed, and favorable powder properties was represented. Therefore, it is possible to realize a particulate nucleating agent in which powder property change is suppressed even after a long period of storage after packaging.

In addition, the particulate nucleating agents of Examples 1 to 4 are excellent in fluidity properties, has a small Haze value within a range in which there is no practical problem, and can enhance transparency of a crystalline polymer.

Therefore, it was recognized that the particulate nucleating agents of Examples 1 to 4 can be appropriately used as a nucleating agent and a transparentizing agent.

Priority is claimed on Japanese Patent Application No. 2018-096303, filed on May 18, 2018, the content of which is incorporated herein by reference.

The invention claimed is:

1. A particulate nucleating agent comprising:
a compound represented by the following General Formula (1),
wherein a range WA of a particle size distribution measured by the following procedure A and a range WB of a particle size distribution measured by the following procedure B satisfy the following Expression (I):

$0.3 \leq WA/WB \leq 13.5$  Expression (I);

(Procedure A)
dispersion air of a dispersion pressure of 30 psi is blown to the particulate nucleating agent, and dry type measurement is performed on the particle size distribution of the particulate nucleating agent, setting the particulate nucleating agent dispersed in air as a measurement target, using a laser diffraction particle size measurement device;
as the particle size distribution, a volume mean particle size MvA and a number mean particle size MnA of the particulate nucleating agent are obtained;
based on WA=MvA/MnA, the range WA of the particle size distribution is calculated;

(Procedure B)
packed treatment is performed on the particulate nucleating agent set as the measurement target of the procedure A in the following manner:
packed treatment: the particulate nucleating agent is put in a tray made of an aluminum foil, and in a state in which a load of 60 g/cm² is added to the particulate nucleating agent in the tray, the tray is left still in a constant-temperature oven having a relative humidity of 80% at 40° C. for 24 hours;
subsequently, without blowing dispersion air to the particulate nucleating agent, dry type measurement is performed on the particle size distribution of the particulate nucleating agent, setting the particulate nucleating agent after packed treatment dispersed in the air as the measurement target, using the laser diffraction particle size measurement device;
as the particle size distribution, a volume mean particle size MvB and a number mean particle size MnB of the particulate nucleating agent are obtained;
based on WB=MvB/MnB, the range WB of the particle size distribution is calculated;

in the above General Formula (1), $R^1$ to $R^4$ each independently represent a hydrogen atom or a straight chain or branched alkyl group having 1 to 9 carbon atoms, $R^5$ represents a hydrogen atom or an alkyl group having 1 to 4 carbon atoms, m represents 1 or 2, in a case where m is 1, $M^1$ represents a hydrogen atom or an alkali metal atom, and in a case where m is 2, $M^1$ represents a group 2 element, Al (OH) or Zn.

2. The particulate nucleating agent according to claim 1, which satisfies the following Expression (II):

$3 \leq WA \leq 45$  Expression II.

3. The particulate nucleating agent according to claim 1, wherein the compound includes one or two or more compounds represented by the following chemical formulae (2) to (13):

(5)

(6)

(7)

(8)

(9)

(10)

(11)

(12)

(13)

4. A resin composition comprising a thermoplastic resin including the particulate nucleating agent according to claim 1.

5. The resin composition according to claim 4, wherein the thermoplastic resin includes a crystalline polymer.

6. The resin composition according to claim 5, wherein the crystalline polymer includes a polyolefin-based polymer.

7. The resin composition according to claim 4,
wherein a content of the particulate nucleating agent is equal to or more than 0.001 parts by weight and equal to or less than 10 parts by weight with respect to 100 parts by weight of the thermoplastic resin.

8. The resin composition according to claim 4, which is in a pellet form.

9. A molded product obtained by using the resin composition according to claim 4.

10. A production method of producing a molded product by using the resin composition according to claim 4.

* * * * *